US005702199A

United States Patent [19]

Fishback et al.

[11] Patent Number: 5,702,199

[45] Date of Patent: Dec. 30, 1997

[54] PLASTIC ASPHALT PAVING MATERIAL AND METHOD OF MAKING SAME

[75] Inventors: Gary M. Fishback, Coyote, N. Mex.; Dennis M. Egan; Hilary Stelmar, both of El Cajon, Calif.

[73] Assignee: Plasphalt Project Ltd. Co., Coyote, N. Mex.

[21] Appl. No.: 555,527

[22] Filed: Nov. 9, 1995

[51] Int. Cl.[6] .............................. C08L 95/00; E01C 11/00

[52] U.S. Cl. .............................. 404/17; 404/27; 524/59

[58] Field of Search .............................. 404/17, 27, 71, 404/81, 82; 44/589; 106/281.1; 524/59

[56] References Cited

U.S. PATENT DOCUMENTS

| | | | |
|---|---|---|---|
| 3,852,046 | 12/1974 | Brown . | |
| 3,909,474 | 9/1975 | Borchert et al. | 404/17 X |
| 4,028,293 | 6/1977 | van den Berg . | |
| 4,052,219 | 10/1977 | Marrs et al. . | |
| 4,548,962 | 10/1985 | Lindmark | 524/59 X |
| 4,797,434 | 1/1989 | Lovatt-Smith | 524/59 X |
| 5,252,641 | 10/1993 | Dawans . | |
| 5,296,025 | 3/1994 | Basin et al. . | |
| 5,302,638 | 4/1994 | Ho et al. | 524/59 |
| 5,308,898 | 5/1994 | Dawans . | |
| 5,367,007 | 11/1994 | Richards | 524/59 |
| 5,380,773 | 1/1995 | Bellio et al. | 524/59 X |
| 5,558,703 | 9/1996 | Bredael | 106/281.1 |

FOREIGN PATENT DOCUMENTS

| | | | |
|---|---|---|---|
| 2549794 | 5/1976 | Germany | 524/59 |
| 117531 | 5/1993 | Japan | 524/59 |
| 140464 | 6/1993 | Japan | 524/59 |
| 7305619 | 10/1974 | Netherlands | 524/59 |

OTHER PUBLICATIONS

Plasma Science, Inc., Technical Notes, Feb., 1990, No. 9, "Plasma Surface Treatment of Plastics To Enhance Adhesion: An Overview", by Stephen L. Kaplan and Peter W. Rose.

Chemical Abstracts, vol. 115, p. 327 (1991), 141361y, "Manufacture of lightweight aggregate from recycled waste plastics, and uses of the lightweight concrete obtained with the aggregate" by Markus Stracke.

Plasma Science, Inc., Technical Notes, Apr., 1988, No. 4, "Gas Plasma Treatment Of Spectra® Fiber" by S. L. Kaplan, et al.

Plastics News, Sep. 18, 1995, pp. 17–18, "Polyphalt licenses paving product" by Tom Ford.

Waste Dynamics, Oct., 1995, "Tribe experiments with recycled plastic in asphalt mix", author unknown.

(List continued on next page.)

*Primary Examiner*—James Lisehora

*Attorney, Agent, or Firm*—Wood, Herron & Evans, L.L.P.

[57] ABSTRACT

An asphaltic concrete or paving material includes from 5 to 20 percent or more of granular recycled plastic, which supplements or replaces the rock aggregate component of the mixture. The material produces a structurally superior paving material and longer lived roadbed. The paving material includes any and all residual classes of recyclable plastic, including thermosetting plastics and other plastics having little to no current widespread utility. The material produces roadbeds of higher strength with less total asphalt thickness and having greater water impermeability, and is most useful for all layers below the surface layer. The recyclable plastic component of the material is preferably a mixture of all recyclable classes 3 through 7, or of those materials from such classes from which potentially more valuable recyclable materials have been selectively removed. The paving product is preferably formed by a process of shredding or mechanically granulating used and industrial waste plastic to a no. 4 to ½ inch sieve size, and preferably to ¼ inch to ⅜ inch granules. The granules are then treated with a reducing flame, with a plasma flame process, to activate the surface of the granules and increase the surface tension without raising the temperature of the plastic. The activated treated granules are then added to the aggregate and mixed with the asphalt to produce the paving material.

30 Claims, 1 Drawing Sheet

13 10 7 11 12

OTHER PUBLICATIONS

Chemical Abstracts, vol. 116, p. 350 (1992), 199880d, "Utilization of plastic waste in asphalt mixtures used in road construction" by Lubomir Polakovic, et al.

Chemical Abstracts, vol. 118, p. 69, 214497w, "Molding of waste asphalt and waste plastics" by Toshiharu Furuya, et al.

Annual Technical Conference—Society of Plastics Engineers—1992, 50th(2) pp. 2457–2461, "Rheological Properties Characterization of Scrap Plastic Modified Asphalt" by S. M. Mohseen, et al., University of Florida, Department of Material Science & Engineering.

Chemical Abstracts, vol. 119, (1993), 166576t, "Improved paving compositions" by Hideya Tsuji.

Chemical Abstracts, vol. 119, (1993) 166575t, "Asphalt compositions for paving and waterproofing" by Hideya Tsuji.

Chemical Abstracts, vol. 120, p. 540, (1994), 142202n, "Waste plastics in road construction" by Ulrich Winkler (copy of article attached but not translated).

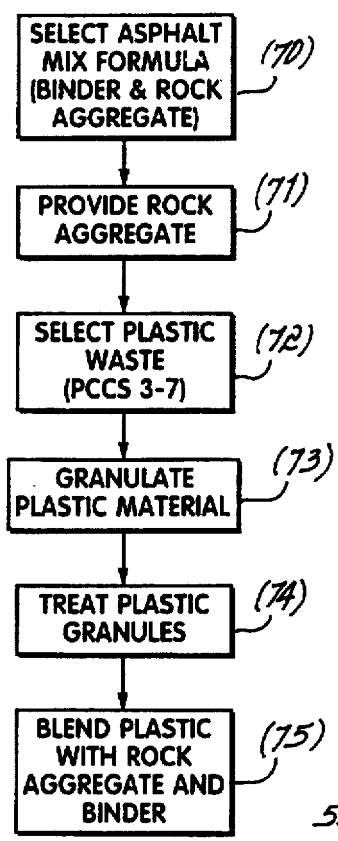
FIG. 1
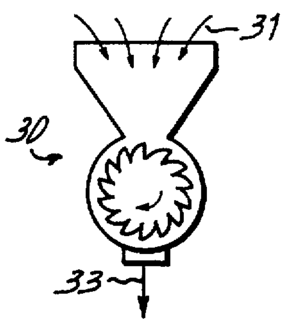
FIG. 2
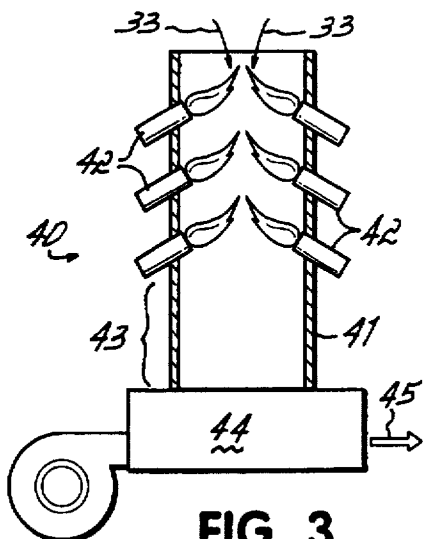
FIG. 3
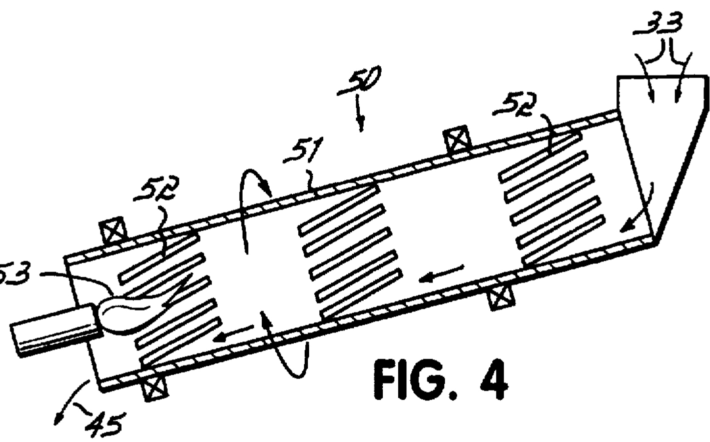
FIG. 4
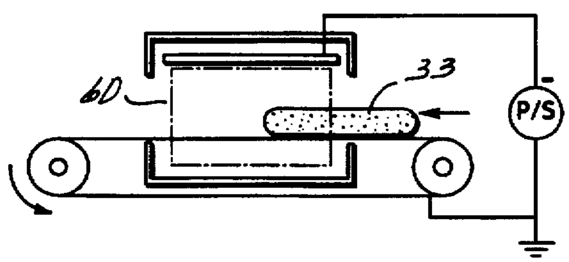
FIG. 5
FIG. 6
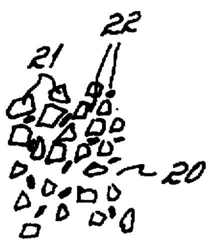
FIG. 7

PLASTIC ASPHALT PAVING MATERIAL AND METHOD OF MAKING SAME

This invention relates to pavements and paving materials and the use of recycled plastics therein, and more particularly, to pavements, to paving materials for use therein, and to a method of making such paving materials and pavements having residual recycled plastic components.

BACKGROUND OF THE INVENTION

Paving materials such as asphaltic concretes that are used for roadways, parking areas, walkways and other traffic surfaces have been the subjects of various efforts to improve their properties. Some of these efforts have involved the addition of polymers, including plastics, in attempts to improve the flexibility, strength and life of the paving material. Such efforts have proved either ineffective or too costly.

The increasing need to dispose of or find new uses for previously used or recycled plastics has given incentives to the efforts to introduce plastics from recycled sources into building or paving material, either to facilitate their disposal where it is hoped that their introduction does not degrade building or paving material and does not increase its cost, or where it is hoped that their introduction will provide a cost effective improvement in the properties of the building or paving material. Work has been done to utilize low density plastic and films of selected and graded recycled plastic materials as an additive to the asphaltic binder component of asphaltic concrete paving material in an effort to improve the flexibility and reduce the propensity of the paving material to crack. This effort requires that the recycling task to collect suitable plastic material be selective, or that the material be specifically sorted from a general mixture of recycled plastic material. Such recycled plastic material has a cost that is significantly greater than that of the general ungraded recycled plastic material mixture.

For example, it has been proposed to melt polystyrene foam with asphalt, to add sand, and to mold the material as a concrete substitute, thereby utilizing the waste plastic. Further, it has been proposed to add waste polyethylene to asphalt for road construction to increase pavement durability. Decreased deformation resistance and increased hardness and ductility have been reported by adding other plastic waste in amounts of, for example, eight percent to paving compounds containing aggregate, where the plastic waste includes specific plastics made of specific combinations of low density polyethylene, cyclophane, cellophane, polypropylene, and polyvinyl dichloride. Fiber reinforced plastics and chopped glass have been proposed for addition to add to asphalt to improve wear resistance and water permeability.

Proposals to use specific waste plastics as additives to asphalt mixes have had the disadvantage of requiring specific collection of the individual material or the sorting of the desired material from the generally collected plastic waste. Such efforts calling for specific plastics are therefor costly. Furthermore, such efforts do little to solve the problem of utilization of vast unsorted, unsortable or unclassified bulk mixtures of plastic waste.

Waste plastics are found in several forms. In one form, bulk masses of particular identified plastic materials are produced as waste in the plastics industry. In other forms, plastics are found in the form of discarded articles and containers. Some such plastics, particularly plastic bags and plastic bottles, are collected in recycling activities. Recycled plastic bottles are classified according to a nationally recognized identification system known as the Plastic Container Code System (PCCS) into seven classes that are being identified by markings on the bottles. These classes are: class 1, polyethylene terephthalate (PETE), class 2 high density polyethylene (HDPE), class 3, vinyl and polyvinyl chloride or PVC (V), class 4, low density polyethylene (LDPE), class 5, polypropylene (PP), class 6, polystyrene (PS) and class 7, all other resins and layered multi-material. For convenience, these classes are used below to identify waste plastics that are also in a form other than that of bottles for which the classes were specifically established.

Recycled plastics corresponding to classes 1 and 2, and sometimes classes 4, 5 and 6, have been sorted from the general mass of recycled material or separately collected, all at increased cost. Bulk mixtures of recycled plastics from more than one of the PCCS classes, particularly materials from class 7 and from class 3 when mixed with material from other classes, generally have been regarded as lacking utility and are accordingly routed to landfills. Such materials have lacked an alternative use or manner of disposition.

The employment of plastics in asphalt mixes has presented various problems. Many of the plastic additives have lacked an ability to bond to or combine with the asphalt binders of the mix. Chemical treatments have been proposed, but such treatments have been ineffective, add to the cost, and introduce additional noxious and toxic substances into the process, aggravating the waste disposal problems.

Accordingly, there remains a need for a low cost manner of enhancing the properties of paving material and there remains a need for a use of residual plastic waste, particularly unclassified or unseparated materials or materials of mixed classes.

SUMMARY OF THE INVENTION

It is an objective of the present invention to improve the properties of pavements and of paving materials, particularly asphaltic concrete materials, and most particularly, to improve the strength and useful life of the pavements made of the paving materials.

It is a particular objective of the present invention to improve the properties of paving materials at a minimum increase in cost or at a savings in cost from that of the standard asphaltic paving material.

A further objective of the present invention is to provide a use for recycled or waste plastic materials, particularly thermosetting and other PCCS class 7 materials, and other combinations of materials of more than one class, particularly classes 3 through 7.

A further objective of the present invention is to provide a method of paving material, particularly asphaltic paving material, and of utilizing waste plastic in paving material manufacture.

According to principles of the present invention, there is provided a method of making a paving material that includes the step of providing bulk residual plastic waste materials including materials of the type corresponding to PCCS classes 3–7, and preferably materials of more than one such class, the step of processing the plastic to a form suitable for combining with asphalt, and the step of combining the processed plastic with asphaltic binder and with rock aggregate to form an asphaltic concrete paving material. Further, the step is added of forming a pavement with the material. In addition, a paving material and pavement are provided that are made according to such process.

According to the preferred embodiment of the invention, recycled plastic material that is unclassified, or is in the form of bulk material containing plastics corresponding to more than one of the PCCS classes 3 through 7, or contains thermosetting plastics and other plastics of PCCS class 7, are provided, The plastic material is either pelletized, is shredded or otherwise mechanically granulated, or otherwise formed into particles. Conventional asphaltic binder material and graded aggregate that includes rock particles ranging in size are also provided. Typically the aggregate will include from five to seven sieve sizes ranging from no. 40 to three-fourths inch in size, or preferably from no. 200 to one inch in size. The particles of plastic are preferably of a size that corresponds to one of the intermediate sizes of the rock aggregate. Preferably further, the paving material is formed by mixing from five to twenty-five percent or more of the plastic particles, measured by volume, with the rock aggregate and the asphaltic binder. Also the amount of aggregate may be varied from the standard ratio mixture with the binder by reducing the amount of mid-range aggregate by an amount not more than the amount of added plastic, and preferably by an amount that is somewhat less than the amount of added plastic. Preferably, the particles of plastic are in the one-eighth to one-quarter inch sieve range, and may be three-eighths inch or larger. The particles of plastic will be generally flatter and more elongated in shape than the shapes of the particles of the rock aggregate component of the mixture.

Further in accordance with the preferred embodiment of the present invention, the plastic particles are further processed to activate the surfaces of the plastic particles to increase the surface tension and to cause free or active carbon atoms to be present in the molecules of the plastic material at the particle surface. The activation of the particle surfaces is preferably performed with minimal heating, burning or melting of the plastic, and may be achieved by exposing the surface to high energy treatment-gas atoms, ions or molecules for a limited duration. Such a gas may be in the form of a flame, or in the form of a plasma or corona, or other electrically or otherwise enhanced gas or vapor, that will cause the activation or increased energization at the surfaces of the plastic particles. Such a treatment is achieved, in one embodiment described below, with the use of a reducing flame, exposing the particles to the outer envelope of such flame. The exposure may be carried out by passing the particles on a conveyor through the flame, dropping the particles through a flame treatment tower or otherwise contacting the particles briefly with the flame. The use of a ionized or plasma enhanced gas to activate the particle surfaces is also suitable, and may be carried out by transporting the particles on an electrically conductive conveyor. Other forms of gas reactant treatment may be used to activate or etch the surface. The activated surfaces of the plastic particles are thought to enhance the bonding between the asphaltic binder and the plastic particles and do so with minimal or insignificant heating of the plastic. Such plastic particles are blended with the asphaltic binder and with rock aggregate at normal low temperatures of below 300° F.

The present invention provides a paving material and pavement that is thirty to fifty percent stronger than the required strength of road paving materials, and is up to thirty to fifty percent stronger than standard asphaltic concrete that is not modified with the addition of the plastic particles as described above. The invention provides a use for the low use or otherwise useless recycled plastic compositions, and disposes of unclassified or residual class plastic material. The cost of the added plastic material is very low, with the untreated plastic material approaching no cost at all, compared with the cost of its disposal. The invention allows the reduction in the total amount of paving material in proportion to the increased strength of the material, thereby providing a cost savings in the reduced amount of asphaltic concrete required, which may more than offset the cost of providing, treating and blending the plastic.

These and other objectives and advantages of the present invention will be more readily apparent from the following detailed description of the of the preferred embodiments of the invention.

BRIEF DESCRIPTION OF THE DRAWINGS

FIG. 1 is a flowchart of one preferred embodiment of a method according to the present invention;

FIG. 2 is a diagram of a shredder suitable for use with the method of FIG. 1;

FIG. 3 is a diagram of a flame treatment tower suitable for use with embodiments of the method of FIG. 1.

FIG. 4 is a diagram of an alternative form of flame treatment apparatus suitable for use with embodiments of the method of FIG. 1;

FIG. 5 is a diagram of a plasma treatment apparatus suitable for use with embodiments of the method of FIG. 1.

FIG. 6 is a cross-sectional diagram of a roadway according to certain embodiments of the present invention; and FIG. 7 is an enlarged view of a portion of FIG. 6.

DETAILED DESCRIPTION OF THE PREFERRED EMBODIMENT

One preferred embodiment of the invention is set forth herein in the form of a description of a test or example of a process (FIG. 1) of making a paving material. In accordance with this preferred embodiment of the present invention, a standard asphaltic mix is selected (70). One such suitable mix is, for example, New Mexico State Highway and Transportation Department (NMSHTD) type I A asphaltic mix. Further, a mixture of local rock aggregate suitable for asphaltic concrete for use in highway construction is selected (71). Such a rock aggregate mixture used in this example includes particles of the following sizes, as set forth in Table 1:

TABLE 1

| Sieve Size | Percent Passing |
|---|---|
| 1 inch | 100 |
| ¾ inch | 86 |
| ½ inch | 67 |
| ⅜ inch | 57 |
| No. 4 | 42 |
| No. 10 | 34 |
| No. 40 | 21 |
| No. 200 | 5.1 |

Next, in the example, a volume of bulk recycled plastic material is selected (72). The bulk plastic material may be ungraded or unsorted and thereby contain plastics corresponding to PCCS classes 1 through 7, but preferably is a residual ungraded bulk of recycled plastic from which most of the items of class 1 (polyethylene terephthalate) and class 2 (high density polyethylene) have been removed. It is also contemplated that some of the class 4 plastic (low density polyethylene) and low density foam plastic from class 6 (polystyrene) may have been removed. The bulk material may contain bottles and other waste plastic articles, layered, thermosetting and miscellaneous plastic articles from class 7, PVCs from class 3, and masses of waste plastic from plastic production and molding industries. In the example, a representative average sample including an assortment of plastic waste corresponding to the plastics of classes 3 through 7 was selected.

Then, the plastic material 30 is granulated (73). The granulation process typically involves the shredding of the plastic material 30 in a shredder 31 that employs a plurality of knife blades 32 to reduce the mass of plastic to a uniform blend of particles. The particles 33, as illustrated in FIG. 2 include a large percentage of generally flat flake or plate-like pieces that are generally more elongated than the particles of the rook aggregate referred to above. In the example, the sizes of the granulated plastic particles included 18 percent that passed sieve no. 10, with all of the particles passing sieve no. 4. It is contemplated, however, that, for use with the rock aggregate described above, most of the plastic particles will be in the ¼ inch to ⅜ inch range, and perhaps larger. They will nonetheless be smaller than, and preferably less than half the size of, the largest rock aggregate particles.

The granulated, plastic particles are then treated (76) to activate the particle surfaces. The manner of activating the surfaces of the plastic particles is preferably by exposing the particles briefly to a flame treatment. It is preferable to expose the plastic particles to the flame intermittently if increased exposure is desired than to maintain the flame constantly, which could unnecessarily heat the plastic. The flame in the described embodiment is preferably a reducing flame. In other embodiments, a plasma, corona or ionized gas 60 (FIG. 5) may replace or be combined with the flame. A reducing flame may be produced by natural gas, propane, or other fuel. In the example, an oxyacetylene reducing flame is used and the plastic particles were spread on a screen and brushed repeatedly with the flame from above and below, using a torch maintained at a distance of about twelve inches from the flame, with agitating and turning of the plastic particles. The duration or dwell of the flame on any of the particles is preferably kept sufficiently short to avoid any significant melting or burning the particles or causing a visually perceivable change in the appearance of the plastic particles. A small percentage of the plastic that might be of the lower density, lower melting point types or include exceptionally thin sheet shreds or narrow fibers may, in such a process, melt or char without adversely affecting the process or paving material to be produced.

In one form of the preferred embodiment of the invention, it is contemplated that the activating gas treatment of the granulated plastic particles 33 be carried out in a flame treatment tower 40, as illustrated in FIG. 3. Such a tower may be a vertically elongated cylindrical column 41 having a plurality of inwardly directed, and possibly upwardly inclined gas jets 42 spaced around the column and at vertical intervals. The fuel to oxygen mixture of the flame is set to create a slightly oxygen poor or reducing flame throughout the center of the column through which the granulated particles are dropped. Depending on the height of the column used, the particles 33 may be repeatedly dropped through the flame. Use of a flame treatment tower 40 in which the particles are dropped through the flame, rather than the use of a conveyor or other structure to support the particles for treatment with the flame, avoids possible sticking to the support caused by a softening or melting of a small percentage of the plastic material in the flame. Such a tower should have a cool air region 43 at the bottom of the tower to facilitate a rehardening of any softened plastic, and the collection of treated particles 45 at the bottom of the tower should include a fluidized air bed 44 or agitating mechanism to avoid a sticking together of the treated particles.

In an alternative form of the preferred embodiment of the invention, flame treatment is performed in an inclined drum tumbler 50, as illustrated in FIG. 4. The tumbler 50 is in the form of an elongated cylindrical barrel 51, inclined at less than 20 or 25 degrees to the horizontal, and preferably at about 10 to 15 degrees to the horizontal. The barrel has a plurality of longitudinal vanes 52 running generally parallel or slightly spiraled relative to the axis of the barrel. The reducing flame 53 is made to flow upwardly through the center of the barrel around the axis thereof as the barrel is rotated. The granulated plastic particles 33 are fed into the top of the barrel and proceed to be tumbled through the flame several times as they proceed toward an outlet at the bottom end of the inclined cylinder 51. The constant rotary motion of the barrel, which is kept relatively cool, prevents the sticking to the barrel of any particles 45 that might have been softened.

It is further contemplated that the particles may, for some uses, be pelletized prior to the activating treatment. To pelletize the particles of plastic, the particles would be fed from a hopper into a pelletizing extruder in which a mild heating element would heat the particles to soften some of the plastic components and promote sticking of the particles. An auger would then compress the warmed particles and extrude them through an extrusion die to be cut into pellets of more or less uniform size. Such pellets would then be treated as described above.

Treatment by exposing the particles to ionized gas, plasma, corona discharge 60 or other electrically energized treatment medium may be carried out by presenting the plastic particles 33 upon a conveyor 61, which may be effective to maintain charge on the plastic particles, while exposing the particles to the treatment medium 60, as illustrated in FIG. 5.

When the plastic has been treated, it is preferred that it be used as soon as possible, preferably within a day or days of treatment, or that the treated plastic be kept out of contact with freely flowing air or sunlight until used. Use of the plastic involves a blending (78) of the plastic particles with the rock aggregate and with the asphaltic mix binder in a manner that is conventional for the formulation of asphaltic paving material for road surfaces (FIG. 1). The plastic particles function more as does the rock aggregate component of the asphaltic concrete than as does the asphaltic binder. Only a minor or incidental portion of the plastic, that which is lower density and lower melting point, would soften and blend with the asphaltic component. Instead, the plastic particles supplement the mid-size rock aggregate components. The percentage of the mid-size particles of the rock aggregate may be reduced in the mix, although that is usually not necessary.

An example of the he road surface produced is illustrated in FIG. 6 and includes an asphaltic layer 10 overlying the base gravel layer 11 to form a roadway 12. The asphaltic layer 10 may not be the top layer of the roadway 12, but the roadway 12 may also include a surface layer 13 overlying the asphaltic layer 10. The asphaltic layer 10, as illustrated in FIG. 7, is formed of an asphalt binder 20 and a rock aggregate 21 having mixed therewith at least five percent by volume of plastic particles 22, most of which are no. 10 sieve size or larger. The plastic particles 22 have treated activated surfaces. A major portion, and preferably substantially all, of the plastic particles 22 are of a plastic material composition corresponding to PCCS classes 3 through 7. Preferably, the most of the particles 22 of plastic are of a size at least ⅛ inch large, and preferably are of a size less than ⅜ inch large. The plastic material preferably includes at least thirty percent recycled plastic from the group consisting of thermoset plastics, PVC, and high density polypropylene and polystyrene.

The particles of plastic are believed to strengthen the paving material by adding a slightly flexible interlocking aggregate component that bonds with the asphaltic binder with a partially chemical molecular bond, developing an increased shear resistance of the paving material. The paving material is also more highly impermeable to water, preventing such water from propagating into the gravel bed or subgrade.

Improved properties of the paving material made in accordance with the method of the present invention are illustrated by the example described above. In that example, the treated plastic particles were tested by blending them into the asphaltic mix (using asphaltic concrete 4.4% Navajo 60/70 asphalt cement) that was first heated to a temperature of 265° F. then mixed with the plastic at room temperature. The mixing temperature is preferably that which produces an asphalt cement viscosity of 170+/−20 centistokes kinematic. The plastic was added to the asphaltic mix at a ratio of ten percent by volume, determined from the loose unit weights of the plastic and asphaltic mix. The material was tested by placing it in molds and compacting it to seventy-five blows per side at approximately 250° F. For comparison, other samples were similarly prepared, one sample using the standard asphaltic concrete mix without plastic, and two samples using untreated plastic of the same composition, one added at five percent by volume to the asphaltic mix and one added at ten percent by volume to the mix. The loose unit densities of the components of the mix for the tests were 1.45 grams per cubic centimeter (90.5 pounds per cubic foot) for the asphaltic concrete mix and 0.36 grams per cubic centimeter (22.2 pounds per cubic foot) for the treated and untreated plastic. The five percent by volume of plastic mixes included 1135.88 grams (2.5 pounds) of asphaltic concrete mix and 14.67 grams (0.032 pounds) of plastic, and the ten percent by volume of plastic mixes included 1076.10 grams (2.370 pounds) of asphaltic concrete mix and 39.69 grams (0.065 pounds) of plastic. The tests performed as set forth below and the component analyses as set forth above employed the standards set forth in Table 2:

TABLE 2

| | |
|---|---|
| Extraction | ASTM D-2172 |
| Sieve Analysis | ASTM C-136 |
| Bulk Unit Weight | ASTM D-2726 |
| Rice Unit Weight | ASTM D-2041 |
| Marshall Flow/Stability | ASTM D-1559 |

The results of the test were as follows, as set forth in Table 3:

TABLE 3

| | Marshall Properties of Asphaltic Concrete | | | |
|---|---|---|---|---|
| | No plastic | 5% untreated | 10% untreated | 20% treated |
| Bulk Unit Wt. gms/cm³(pcf) | 2.366 (147.4) | 2.339 (145.7) | 2.261 (140.9) | 2.272 (141.5) |
| Rice Wt. gms/cm³(pcf) | 2.419 (150.7) | 2.396 (149.3) | 2.369 (147.6) | 2.370 (147.7) |
| Air Voids % | 2.2 | 2.4 | 4.6 | 4.1 |
| Stability pounds | 2821 | 3078 | 2432 | 3404 |
| Flow 1/100 in | 11 | 12 | 11 | 11 |

The above results can be compared with the NMSHTD stability requirements of 1640 pounds for non-interstate highways and 1800 pounds for interstate highways. It is found from the tests set forth above that, starting with 2821 pound asphaltic concrete (per the test), the strength increased with the addition of untreated plastic to where it had increased by almost ten percent with the addition of 5% untreated plastic particles. However, the strength decreased as the percentage of untreated plastic particles in the mix increased. With the treated plastic, the strength increased with the addition of the plastic, being about 21% higher than the original asphaltic concrete with the addition of ten percent plastic. It is believed that the strength will exceed that of the original asphaltic concrete mix with treated plastic at up to about 25% with optimally treated and optimally sized plastic particles. Other properties such as flexibility, water impermeability, crack resistance and durability are also expected to be improved over this range.

Those skilled in the art will appreciate that the application of the present invention is herein are varied, and that the invention is described in preferred embodiments Accordingly, additions and modifications can be made without departing from the principles of the invention.

Accordingly, the following is claimed:

1. A roadway comprising:

a base gravel layer;

an asphaltic layer overlying the base layer and including:

an asphalt binder, and an aggregate component, including rock aggregate and at least five percent by volume of particles of a plastic aggregate having treated activated surfaces, a major portion of the plastic aggregate being of a plastic material having a composition corresponding to one or more of PCCS classes 3 through 7; and the particles of plastic aggregate being made according to the process comprising the steps of:

mechanically reducing plastic material to granules, most of which are at least ⅛ inch in size; and treating the surfaces of the granules with an activating vapor at a temperature sufficiently low and for a time sufficiently short to avoid substantial melting, burning or other perceptible change to the surface of the granules, the treating step utilizing a vapor sufficiently active to activate the surfaces of the granules.

2. The roadway of claim 1 wherein:

the mechanically reducing step reduces the plastic material to granules, most of which are less than ⅜ inch in size.

3. The roadway of claim 1 wherein:

the treating step includes the step of treating the surfaces of the granules with activating vapor in the form of a reducing flame.

4. The roadway of claim 1 wherein:

the rock aggregate is between seventy and ninety-five percent by volume of the aggregate component and at least half of which is natural rock ranging in size from no. 40 sieve to no. ¾ inch sieve.

5. The roadway of claim 1 wherein:

the composition of the plastic material is at least thirty percent recycled plastic from the group consisting of thermoset plastics, PVC, and high density polypropylene and polystyrene.

6. The roadway of claim 1 wherein:

the treating step includes the step of treating the surfaces of the granules with activating vapor in the form of a plasma.

7. The roadway of claim 1 wherein:

the plastic material includes predominantly residual recycled plastic material.

8. The roadway of claim 1 wherein:

the plastic material includes a composition of a plurality of different plastic materials corresponding to at least two different ones of PCCS classes 3 through 7.

9. A roadway comprising:

a base layer comprised substantially of gravel; and an asphaltic layer overlying the base layer and formed of an asphalt binder and aggregate;

the aggregate including at least five percent by volume of particles of plastic aggregate, the particles of plastic aggregate having treated activated surfaces at which the particles of plastic aggregate bond to the asphalt binder, the particles of plastic aggregate having a substantial portion thereof which is of a plastic material of a composition corresponding to one or more of PCCS classes 3 through 7; and the particles of plastic aggregate being made according to the process comprising the steps of:

mechanically reducing the size of at least portions of plastic material to granules thereof of a given size; and treating the surfaces of the granules with an activating vapor at a temperature sufficiently low and for a time sufficiently short to avoid substantial melting, burning or other perceptible change to the surface of a major portion of the granules, the treating step utilizing a vapor sufficiently active to activate the surfaces of the granules so as to enhance the bonding thereof to the asphaltic binder.

10. The roadway of claim 9 wherein:.

most of the particles of plastic are of a size at least 1/8 inch large.

11. The roadway or claim 9 wherein:

most of the particles of plastic are of a size less than 3/8 inch large.

12. The roadway of claim 9 wherein:

the particles of plastic are substantially all from the group consisting of plastic material corresponding to PCCS classes 3 through 7.

13. The roadway of claim 9 further comprising:

a surface layer overlying the asphaltic layer.

14. The roadway of claim 9 wherein:

the plastic material includes at least thirty percent recycled plastic from the group consisting of thermoset plastics, PVC, and high density polypropylene and polystyrene.

15. The roadway of claim 9 wherein:

the rock aggregate is between seventy and ninety-five percent by volume of the aggregate component and at least half of which is natural rock ranging in size from no. 40 sieve to no. ¾ inch sieve.

16. The roadway of claim 9 wherein:

the treating step includes the step of treating the surfaces of the granules with activating vapor in the form of a plasma.

17. The roadway of claim 9 wherein:

the plastic material includes predominantly residual recycled plastic material.

18. The roadway of claim 9 wherein:

the plastic material includes a composition of a plurality of different plastic materials corresponding to at least two different ones of PCCS classes 3 through 7.

19. The roadway of claim 9 wherein:

the treating step includes the step of treating the surfaces of the granules with activating vapor in the form of a reducing flame.

20. A roadway comprising at least one layer wherein:

at least one layer is comprised substantially of gravel;

at least one layer includes an asphalt binder and an aggregate component of at least five percent by volume of particles of a plastic aggregate having treated activated surfaces, a major portion of the plastic aggregate being of a plastic material having a composition corresponding to one or more of PCCS classes 3 through 7; and, the particles of plastic aggregate being made according to the process comprising the steps of:

mechanically educing the size of at least portions of plastic material to granules thereof of a given size; and treating the surfaces of the granules with an activating vapor at a temperature sufficiently low and for a time sufficiently short to avoid substantial melting, burning or other perceptible change to the surface of a major portion of the granules, the treating step utilizing a vapor sufficiently active to activate the surfaces of the granules so as to enhance the bonding thereof to the asphaltic binder.

21. The roadway of claim 20 wherein:

most of the particles of plastic are of a size at least 1/8 inch large.

22. The roadway of claim 21 wherein:

most of the particles of plastic are of a size less than 3/8 inch large.

23. The roadway of claim 20 wherein:

the particles of plastic are substantially all from the group consisting of plastic material corresponding to one or more of PCCS classes 3 through 7.

24. The roadway of claim 20 further comprising:

a surface layer overlying the asphaltic layer.

25. The roadway of claim 20 wherein:

the plastic material includes at least thirty percent recycled plastic from the group consisting of thermoset plastics, PVC, and high density polypropylene and polystyrene.

26. The roadway of claim 20 wherein:

the treating step includes the step of treating the surfaces of the granules with activating vapor in the form of a plasma.

27. The roadway of claim 20 wherein:

the treating step includes the step of treating the surfaces of the granules with activating vapor in the form of a reducing flame.

28. The roadway of claim 20 wherein:

the plastic material includes predominantly residual recycled plastic material.

29. The roadway of claim 20 wherein:

the plastic material includes a composition of a plurality of different plastic materials corresponding to at least two different ones of PCCS classes 3 through 7.

30. The method of claim 20 wherein:

the treating step includes the step of treating the surfaces of the particles with activating medium in the form of a ionized corona or plasma.

* * * * *

UNITED STATES PATENT AND TRADEMARK OFFICE

CERTIFICATE OF CORRECTION

PATENT NO. : 5,702,199

DATED : December 30, 1997

INVENTOR(S) : Fishback et al.

It is certified that error appears in the above-indentified patent and that said Letters Patent is hereby corrected as shown below:

In column 5, line 7, delete "(76)" and insert therefor --(74)--

In column 6, line 21, delete "(78)" and insert therefor --(75)--

Signed and Sealed this

Seventh Day of July, 1998

Attest:

BRUCE LEHMAN

*Attesting Officer*

*Commissioner of Patents and Trademarks*